United States Patent
Joy et al.

(10) Patent No.: US 8,281,300 B2
(45) Date of Patent: Oct. 2, 2012

(54) SOFTWARE PACKAGE MANAGEMENT

(75) Inventors: Jinu Mathew Joy, Secunderabad (IN); Vinayak Joshi, Delhi (IN)

(73) Assignee: Novell, Inc., Provo, UT (US)

(*) Notice: Subject to any disclaimer, the term of this patent is extended or adjusted under 35 U.S.C. 154(b) by 1126 days.

(21) Appl. No.: 12/166,551

(22) Filed: Jul. 2, 2008

(65) Prior Publication Data

US 2010/0005450 A1   Jan. 7, 2010

(51) Int. Cl.
*G06F 9/44* (2006.01)

(52) U.S. Cl. ........................................ 717/170

(58) Field of Classification Search ................. 717/170
See application file for complete search history.

(56) References Cited

U.S. PATENT DOCUMENTS

| | | | |
|---|---|---|---|
| 6,363,499 B1 * | 3/2002 | Delo et al. | 714/15 |
| 6,675,382 B1 | 1/2004 | Foster | |
| 2006/0048129 A1 * | 3/2006 | Napier et al. | 717/168 |
| 2006/0282479 A1 | 12/2006 | Johnson et al. | |
| 2007/0169109 A1 | 7/2007 | Neswal | |
| 2008/0155526 A1 * | 6/2008 | Gokhale | 717/169 |
| 2009/0089776 A1 * | 4/2009 | Sonkin et al. | 717/174 |
| 2011/0225577 A1 * | 9/2011 | Wookey | 717/175 |

* cited by examiner

*Primary Examiner* — Philip Wang
(74) *Attorney, Agent, or Firm* — Schwegman, Lundberg & Woessner, P.A.

(57) ABSTRACT

Apparatus, systems, and methods may operate to receive a request to roll back one or more individually specified software packages to their respective package states at a prior time on a processing system, to determine a series of transactions on the processing system associated with the individually specified software packages and their dependencies, conducted between the current time and the prior time, and to roll back the dependencies and the individually specified software packages to the respective package states on the processing system. Additional apparatus, systems, and methods are disclosed.

23 Claims, 5 Drawing Sheets

SOFTWARE PACKAGE MANAGEMENT

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent records, but otherwise reserves all copyright rights whatsoever. Copyright 2008 Novell, Inc.

BACKGROUND

There are many reasons why it may be desirable to return to a previous operating state on a computer system. For example, after a new software package is installed, it may become apparent that the new software conflicts with other software that already resides on the system. The solution provided by industry is to restore the system to its previous state as of a particular time.

For example, when using the Linux® RPM package manager (originally Red Hat Package Manager, abbreviated RPM) to upgrade a computer system, a group of several software packages may be installed at once, or over time. It may turn out that one of the packages, perhaps installed in the middle of the group with respect to time, leaves the system or some of its components, in an unusable state. If this becomes apparent after several other packages are installed, existing solutions permit rolling the system back to its state before the offending package was installed. However, this activity removes packages that were subsequently installed—perhaps packages that operate with no problems, leading to extra work on the system administrator's part, since packages that function properly will likely be re-installed after the rollback is complete.

SUMMARY

In various embodiments, apparatus, systems, and methods that support software package management are provided. For example, in some embodiments, software package management is provided by receiving a request to roll back individually specified software packages to their respective package states at a prior time on a processing system. To satisfy the request, the series of transactions on the processing system associated with the individually specified software packages and their dependencies, conducted between the current time and the prior time may be determined. Then the dependencies and the individually specified software packages may be rolled back to the respective package states on the processing system. Additional embodiments are described, and along with the foregoing example, will be set forth in detail below.

DETAILED DESCRIPTION

Existing software package rollback options do not provide a way to easily roll back specific packages, along with their dependencies. However, this challenge, among others, can be addressed with many of the embodiments described herein. For example, some of the disclosed embodiments permit restoring selected RPM software packages to a specific time, so that only packages that interfere with system operations are rolled back; the other packages can be left alone.

Thus, system users implementing the mechanisms described herein can choose to use a primarily package-based mechanism to restore individually specified packages to their state at a prior point-in-time, rather than a more conventional mechanism that is primarily time-based, and used to restore an un-named selection of packages to their state at a particular point in time. Some embodiments may further include the restoration of other specified content (e.g., files or data, rather than software packages) to a desired point-in-time.

As used herein, an "application" refers to a set of software instructions, a service, or a system that interacts with data.

A "data source" refers to a volume or collection of volumes that house information used by applications.

"Dependencies" are data, file, or application requirements that exist between software packages. For example, package A may use executable files that are installed by package B. In this example, package B must be installed, or else package A will have unresolved dependencies.

"Individually specified", with respect to software packages or other information, means naming or otherwise identifying an individual software package or collection of information at the package level, or as a collection of individual data items (e.g., a file). It does not refer to unspecified items, whether individual or as part of a group, such as collections of content or directories. For example, it does not refer to a group of items involved in a conventional rollback operation, such as a group of un-named individual packages revised to restore a system to a prior point in time.

"Information" can include instructions and/or data.

A "software package" is an application program or set of programs that are directed to performing a specific function.

The software package rollback solution disclosed herein can be added to any number of Linux® platforms. For example, the solution may be applied to the SuSE Linux® rug utility, as part of the Novell® ZENworks® Linux® management software suite. In many implementations, the rug utility can record RPM transactions as an organized collection of data, perhaps in a table, or as part of a database.

Figure 1:
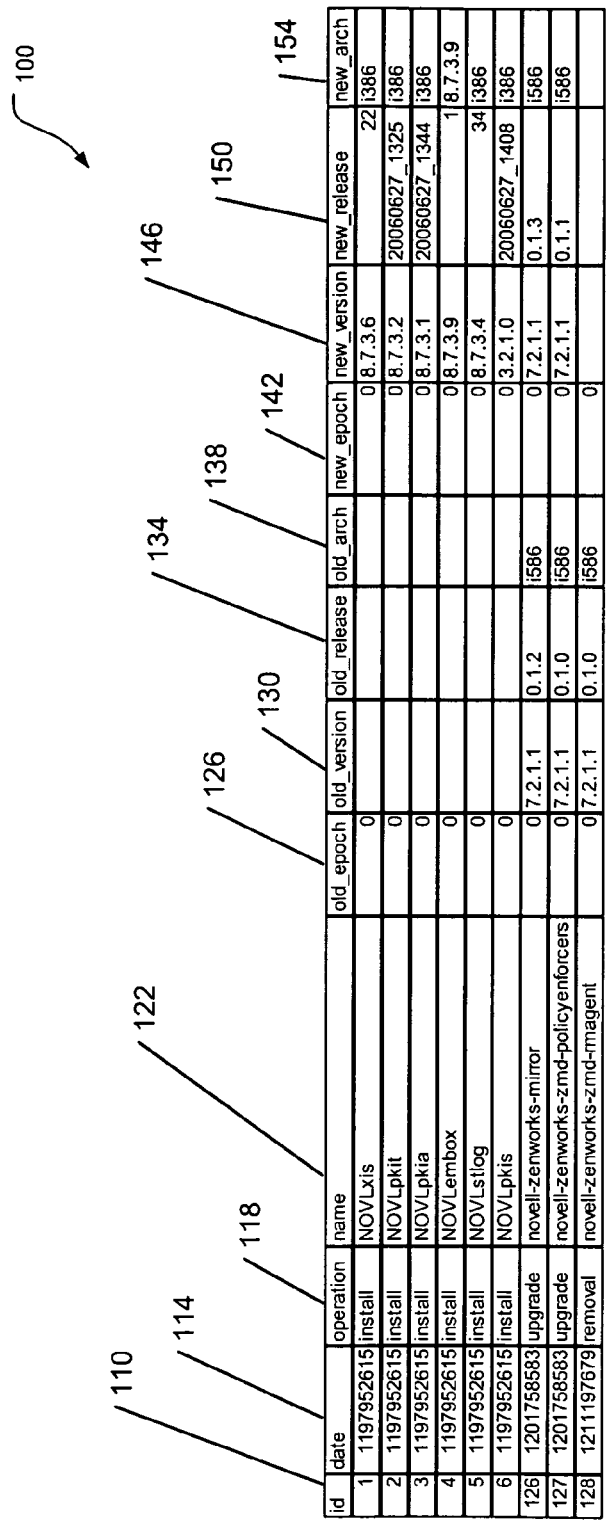
FIG. 1 is a table of sample transactions recorded according to various embodiments of the invention.

FIG. 1 is a table 100 of sample transactions recorded according to various embodiments of the invention. The table 100 can include many items of data, organized in columns. These columns of data will now be described.

The Transaction Id column 110 may be used to identify individual transactions, perhaps ordered numerically according to the time each transaction occurs with respect to other transactions. The Date column 114 may be used to record the date and/or time when a recorded transaction was initiated, or completed. The value recorded may take the form of an integer that can be converted to a specific year, month, day, and time.

The Operation column 118 may be used to record the type of operation that occurred during the transaction, such as "install", "upgrade", or "removal". The Name column 122 may be used record the name of a specific software package, such as an RPM Package name, that was involved in the transaction.

The Old Epoch column 126 and the New Epoch column 142 may be used to record the package epoch property before and after the recorded transaction occurred, respectively. The epoch can be used as part of a package version identifier for version comparison algorithms. Similarly, the Old Version column 130 and the New Version column 136 may be used to record the package version property before and after the recorded transaction occurred, respectively.

The Old Release column 134 and the New Release column 150 may be used to record the package release property before and after the recorded transaction occurred, respectively. The Old Arch column 138 and the New Arch column 154 may be used to record the package architecture property before and after the transaction occurred, respectively. For example, the architecture property may change when the package provider begins supporting a newer architecture, such as an upgrade from i386-based architecture (e.g., an Intel® 80386 processor) to i586-based architecture (e.g., an Intel® Pentium® processor).

When records of the transactions are kept, the information is then available to identify package changes that have occurred over time. The name, epoch, version, release, and architecture information identify each software package transaction uniquely. It should be noted that the table 100 is organized as shown for illustration purposes only, and should not be considered to limit the amount or type of information that can be recorded, or the manner of recording.

In most embodiments, once the transaction data is recorded for various software packages, a command line or graphical user interface (GUI) option can be provided to users to specify a rollback command that optionally accepts package names as arguments, perhaps in the following form:
rug rollback <point-in-time> [-p packagename1, . . . , -p packagenameN]

The point-in-time argument can be specified in various date/time formats. It represents the moment in time to which the user wants to roll back the packages installed on the system. The package names packagename1 through packagenameN, specified via the -p option, along with their dependencies, are rolled back to their respective states as of the specified point-in-time.

Taking the command line input, the table 100 (or some other collection of transaction data) can be queried for all transactions that have occurred since the specified point-in-time, and then filtered to render the package names provided in the command line. The filtered list of transactions can then be parsed to determine the state of each package requested for rollback at the prior point-in-time. At this point, agent functionality (e.g., rug communication) can be used to install, upgrade, or uninstall the packages and their dependencies determined by resolving the rollback command.

Various embodiments of the invention can be implemented in existing network architectures, directory services, security systems, storage interfaces, operating systems, file system processes, backup systems, replication systems, and/or communication devices. For example, in some embodiments, the techniques presented herein are implemented in whole or in part using Novell® network services, proxy server products, email products, operating system products, and/or directory services products distributed by Novell, Inc. of Provo, Utah.

Embodiments of the invention can therefore be implemented in a variety of architectural platforms, operating and server systems, devices, systems, and applications. Any particular architectural layout or implementation presented herein is thus provided for purposes of illustration and comprehension only, and is not intended to limit the various embodiments that can be realized. Thus, many embodiments may be realized.

Figure 2:
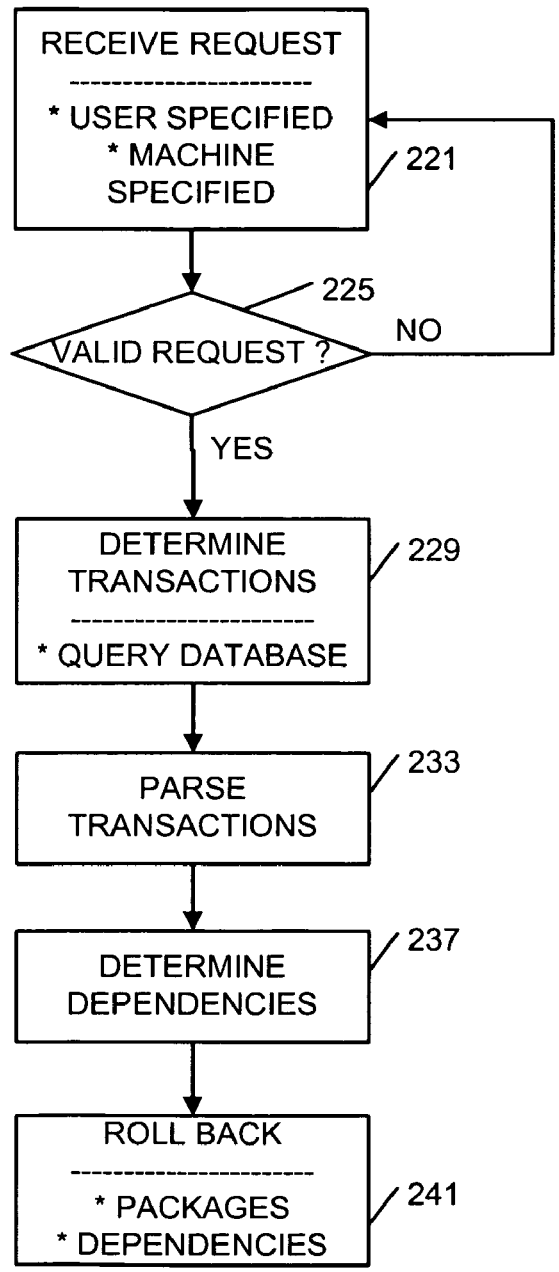
FIG. 2 is a flow diagram illustrating software package management methods according to various embodiments of the invention.

For example, FIG. 2 is a flow diagram illustrating software package management methods 211 according to various embodiments of the invention. The methods 211 are implemented in a machine-accessible and readable medium. The software package management methods 211 are operational over processes within and among networks. The networks may be wired, wireless, or a combination of wired and wireless. The methods 211 may be implemented as instructions which, when accessed by a machine, perform the processing depicted in FIG. 2. Given this context, software package management is now discussed with reference to FIG. 2.

In some embodiments, a method 211 of managing software packages may begin at block 221 with receiving a request to roll back one or more individually specified software packages to their respective package states at a prior time on a processing system. The request may be received as one of a user-specified request or a machine-specified request, among others. Thus, either a user or the system may initiate a package-specific rollback operation.

Therefore, in some embodiments, the request can be received from a command-line interface provided by the processing system. The received request may be formatted to include the prior time and the names of one or more software packages. In some embodiments, the request may be formatted as a package management utility command. Thus, the request may be provided to a package management utility, such as the RPM Package Manager, perhaps used in conjunction with the Linux® rug command line interface.

The request may include the prior time information as a human-readable date and time, or perhaps as an integer or other number convertible to a specific date-time. Thus, the prior time may be received as a specific date-time convertible to an integer, perhaps formatted as "ddd MMM d H:m:s yyyy", or "ddd MMM d H:m:s z yyyy", or "yyyy MMM d ddd H:m:s", among others. Any of these formats can be converted to a corresponding integer for comparison with other recorded transactions. In some embodiments, no conversion is used.

The method 211 may continue on to block 225 to determine whether the received request is valid. For example, if the specified prior time is actually in the future, the method 211 will operate to deny the request, and return to block 221 to wait for the next request.

If the received request is valid, the method 211 may continue on to block 229 with determining a series of transactions on the processing system associated with the individually specified software packages and their dependencies, conducted between the current time and the prior time. Determining the series of transactions may comprise querying a transaction database on the processing system, as described previously.

The method 211 may then continue on to block 233 with parsing the series of transactions to determine the respective package states at the prior time. The recorded transaction information can be used to determine the software package states at the desired rollback date and time.

In most embodiments, the method 211 includes determining dependencies for the software packages that are to be rolled back at block 237. This activity may include parsing the series of transactions to determine respective dependency states of the dependencies at the prior time.

In some embodiments, the determination of dependencies at block 233 occurs in a more indirect fashion. For example, determining dependencies at block 233 may be accomplished using a dependency resolver module to review the state of the various packages on the system at the current time, and then to determine the transactions to be implemented for the various dependent packages such that the they meet the requirements for the individually specified package states at the prior point in time.

The method 211 may continue on to block 241 with rolling back the dependencies and the individually specified software packages to the respective package states on the processing system at the prior time. Rolling back the dependencies may comprise rolling back the dependencies to the respective dependency states at the prior time. These dependency states correspond to the respective package states at the prior time. Other embodiments may be realized.

Figure 3:
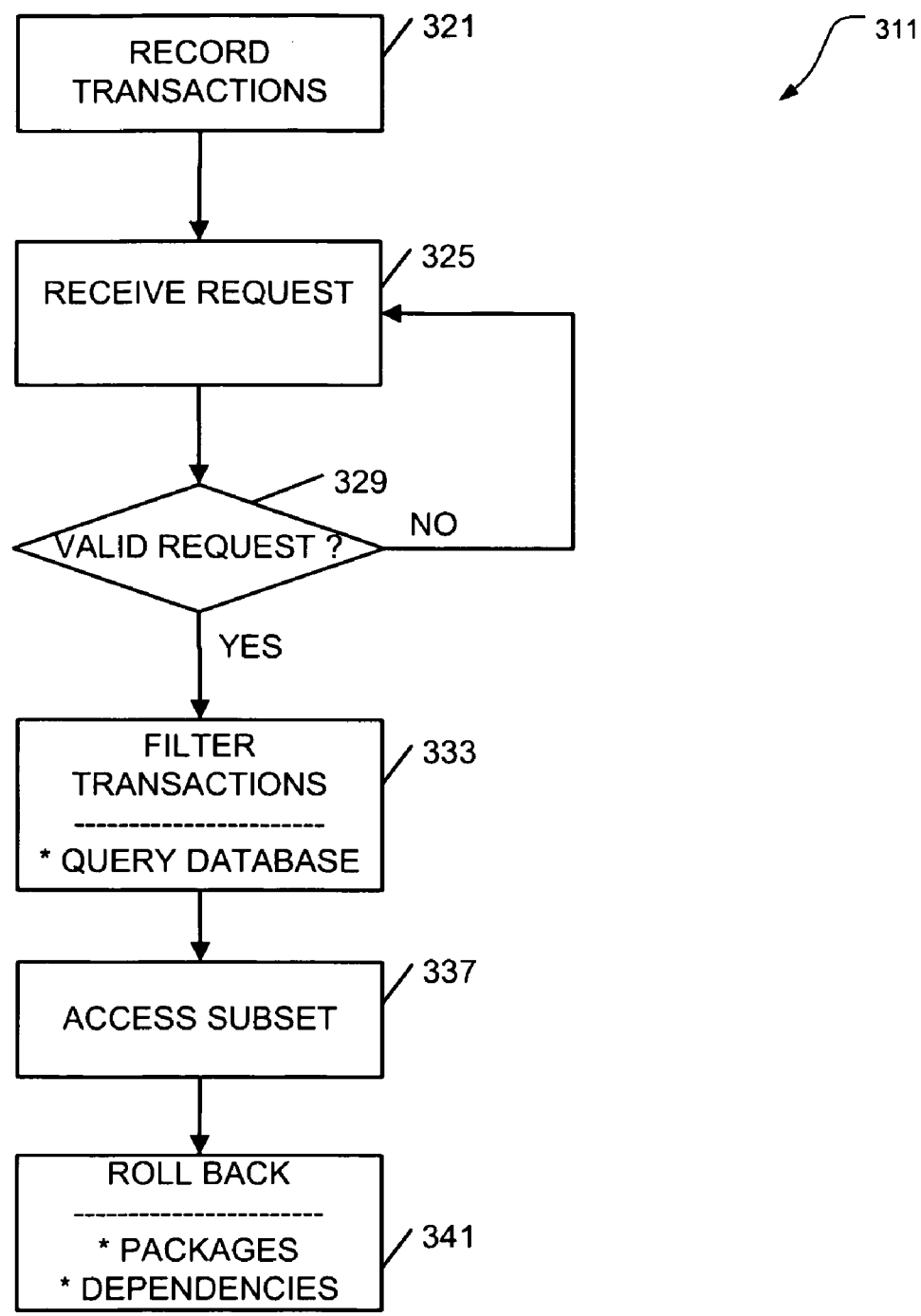
FIG. 3 is another flow diagram illustrating software package management methods according to various embodiments of the invention.

For example, FIG. 3 is another flow diagram illustrating software package management methods 311 according to various embodiments of the invention. In this case, software package management is described with additional emphasis on transaction information processing. The methods 311 are implemented in a machine-accessible and readable medium. The software package management methods 311 are operational over processes within and among networks. The networks may be wired, wireless, or a combination of wired and wireless. The methods 311 may be implemented as instructions which, when accessed by a machine, perform the processing depicted in FIG. 3. Given this context, software package management is now discussed with reference to FIG. 3.

In some embodiments, implementing software package management may comprise a method 311 that begins at block 321 with recording transaction information associated with a plurality of software packages on a processing system. Recording the transaction information may comprise recording the transaction information in a database.

The method 311 may continue on to block 325 with receiving a request to roll back one or more individually specified software packages included in the plurality of software packages to their respective package states on the processing system at a prior time.

The method 311 may then continue on to determine whether the received request is valid at block 329. For example, if one of the packages specified for rollback does not exist on the system, the method 311 will operate to deny the request, and return to block 325 to wait for the next request.

If the received request is valid, the method 311 may continue on to block 333 with filtering a series of transactions conducted between the current time and the prior time to form a subset of the transaction information associated with the one or more individually specified software packages and their dependencies.

Filtering the series of transactions may comprise querying the database to define the subset, based on information included in the request. In some embodiments, the database transaction information comprises at least one each of a date-time, an operation associated with the date-time, a name of one or more of the individually specified software packages associated with the date-time, and version information associated with the date-time.

The method 311 may continue on to block 337 with accessing the subset that has been formed to determine the respective package states at the prior time. In this way, the filtered data can be analyzed to determine individual package states at a specified time. The activity at block 337 may include accessing the subset to determine respective dependency states of the dependencies at the prior time. That is, the filtered data, or other data, can be analyzed to determine individual dependency states at a specified time.

The method 311 may continue on to block 341 with rolling back the dependencies and the individually specified software packages to the respective package states on the processing system at the prior time. Rolling back the dependencies may comprise rolling back the dependencies and the individually specified software packages to the respective package states defined by the subset to exist at the prior time.

The methods described herein do not have to be executed in the order described, or in any particular order. Moreover, various activities described with respect to the methods identified herein can be executed in repetitive, serial, or parallel fashion. The individual activities of the methods shown in FIGS. 2 and 3 can also be combined with each other and/or substituted, one for another, in various ways. Information, including parameters, commands, operands, and other data, can be sent and received in the form of one or more carrier waves. Many other embodiments may be realized.

Figure 4:
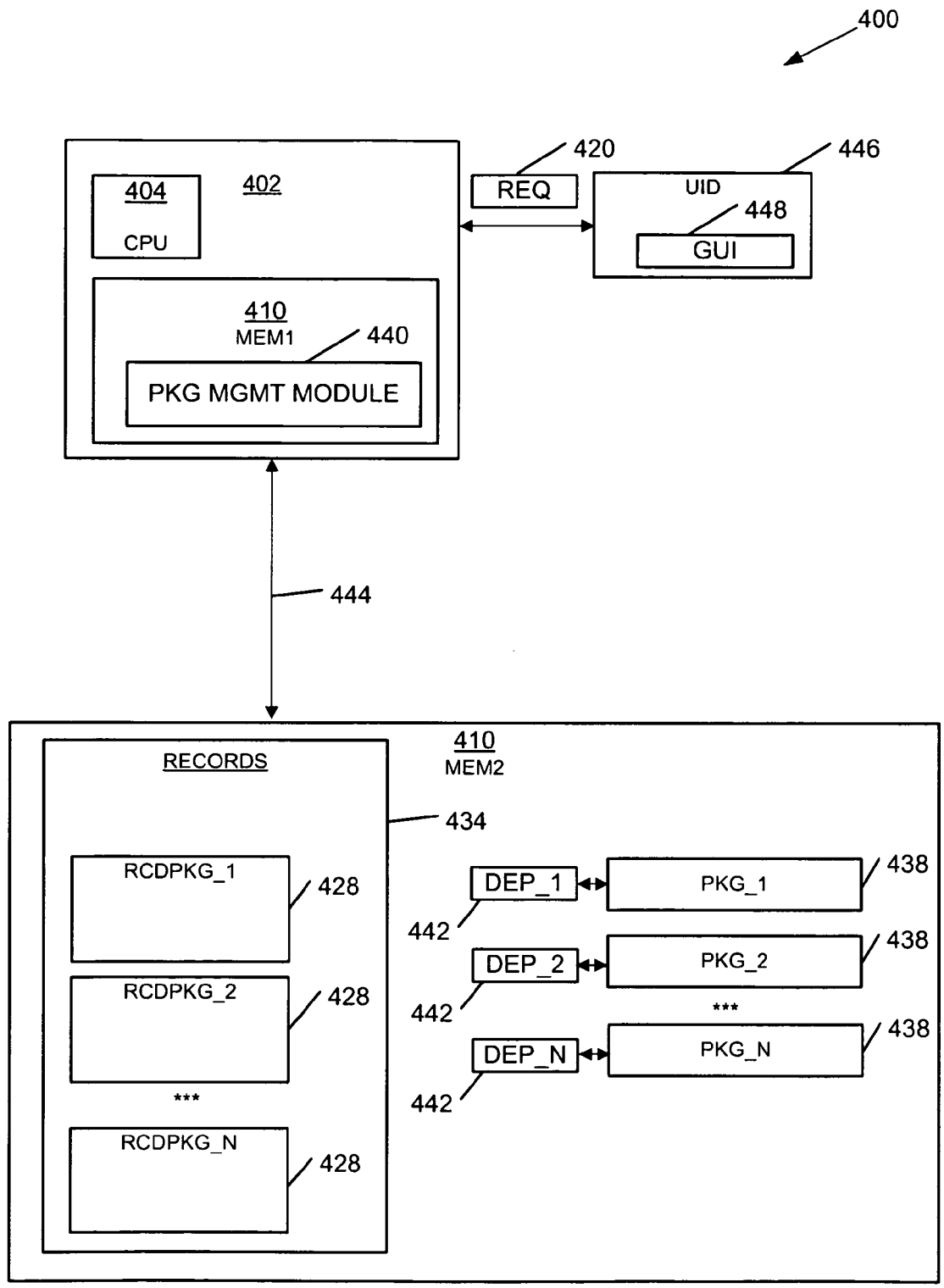
FIG. 4 is a block diagram of a software package management apparatus according to various embodiments of the invention.

For example, FIG. 4 is a block diagram of a software package management apparatus 400 according to various embodiments of the invention. The apparatus 400 may comprise a memory MEM2 to store records 434, including transaction records 428 associated with a plurality of software packages 438. The apparatus 400 may further comprise a processor 404 to receive a request 420 to roll back one or more individually specified software packages (e.g., PKG_1 and PKG_2) included in the plurality of software packages 438 to their respective package states at a prior time on the apparatus 400. The processor 404 may further operate to determine a series of transactions (e.g., RCDPKG_1 and RCDPKG_2) selected from the transaction records 428 associated with the individually specified software packages and their dependencies (e.g., DEP_1 and DEP_2), selected from all of the existing dependencies 442, where the series of transactions was conducted between the current time (e.g., the time the request 420 is received) and the prior time. The processor 404 may operate, perhaps via a package management module 440, to roll back the dependencies 442 and the individually specified software packages to the respective package states on the apparatus 400. Thus, the memory MEM2 may be used to maintain transaction records 428 for the software packages 438, and the processor 404 can operate, perhaps via a package management module 440, to determine how rollback operations will be conducted.

The apparatus 400 may comprise a user interface device 446, such as a display with a graphical user interface (GUI) 448 to receive the request 420. The apparatus 400 may also comprise a software package management module 440 to receive the request 420. For example, the software package management module 440 may comprise an RPM package manager that receives the request 420 as a result of a user entering a Linux® rug command in the GUI 448.

The software package management apparatus 400 can be implemented in a machine-accessible and readable medium that is operational over one or more networks 444. The networks 444 may be wired, wireless, or a combination of wired and wireless. The software package management apparatus 400 implements, among other things, the processing associated with the software package management methods 211 and 311 of FIGS. 2 and 3, respectively.

The apparatus 400 may comprise an execution element 402, such as a switch, a server, a client, a terminal, a personal computer, a workstation, or any combination of these. The memory MEM1 and the processor 404 may be included in a single execution element 302 (e.g., a client), as shown, or exist as separate hardware elements, perhaps coupled together by a local area network (LAN). Similarly, the memories 310 may be included in a single execution element 302

(e.g., a server), or operate as separate units, as illustrated in FIG. 4. Modules may comprise hardware, software, and firmware, or any combination of these.

The execution element 402 may comprise a single entity, or several entities in communication with one another, such as one or more Novell® BorderManager® (NBM) proxy servers, Novell® Access Manager™ Linux® Access Gateways, or any intermediary that facilitates software package management.

Figure 5:
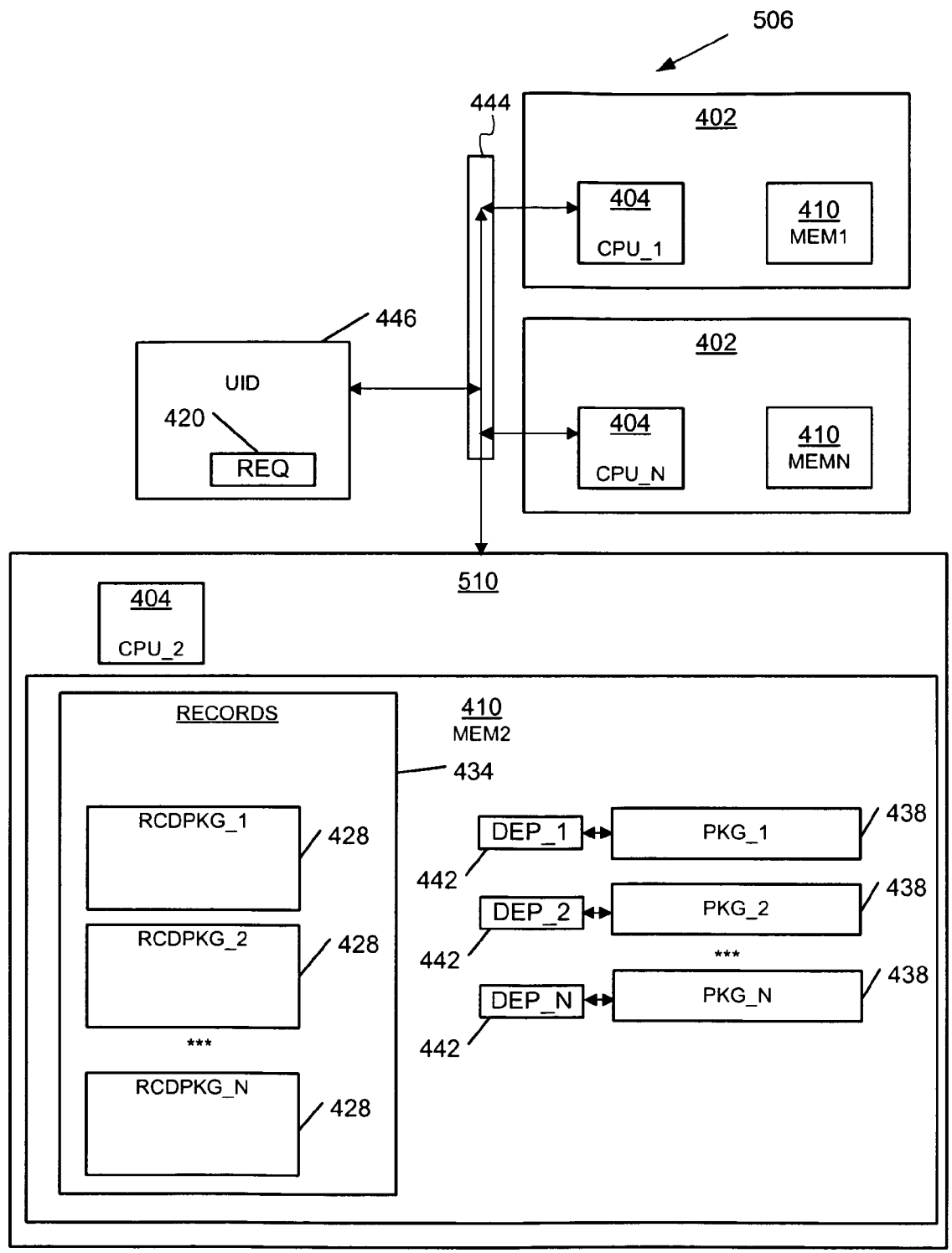
FIG. 5 is a block diagram of a software package management system according to various embodiments of the invention.

FIG. 5 is a block diagram of a software package management system 506 according to various embodiments of the invention. The software package management system 506 may include one or more software package management apparatus 400, and thus, can be implemented in a machine-accessible and readable medium operational over one or more networks 444. The networks 444 may be wired, wireless, or a combination of wired and wireless. The software package management system 506 implements, among other things, the processing associated with the software package management methods 211 and 311 of FIGS. 2 and 3, respectively.

Turning now to FIG. 5, it can be seen that a software package management system 506 may comprise a memory 410, such as a server memory, to store transaction records 428 associated with a plurality of software packages 438. The system 506 may further comprise one or more client processors 402 to transmit a request to roll back one or more individually specified software packages (e.g., PKG_1 and PKG_2) included in the plurality of software packages 438 to their respective package states at a prior time on one or more of the client processors 402. The client processors 402 may operate to determine the series of transactions (e.g., RCD-PKG_1 and RCDPKG_2) selected from the transaction records 428 associated with the one or more individually specified software packages 438 and their dependencies 442, where the series of transactions is conducted between the current time and the prior time. The client processors 402 may further operate to roll back the dependencies (e.g., DEP_1 and DEP_2) and the individually specified software packages (e.g., PKG_1 and PKG_2) to the respective package states on the client processors 402.

The system 506, in some embodiments, may comprise a user interface device 446 to receive the request 420. The user interface device 446 may comprise a keyboard, a mouse, a voice recognizer, a touch screen or pad, etc. The memory MEM2 of the server 510 and the client processor(s) 402 can be coupled to communicate over a network 444.

In some embodiments, the system 506 comprises a plurality of networked execution elements 402 (e.g., servers, clients, or a mixture of each) to house the plurality of processors 404. The memory 410 and the plurality of processors 404 may form a portion of a symmetric multiprocessing architecture, perhaps housed together in a single server 402 (not shown).

Implementing the apparatus, systems, and methods described herein may thus provide package-based, point-in-time restoration of software packages. As a result, the overall efficiency of system operations may be increased, since less time may be spent on re-installing software packages that have not interfered with system operations.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus, comprising:
   a memory to store transaction records associated with a plurality of software packages; and
   a processor to receive a request to roll back one or more individually specified software packages included in the plurality of software packages to their respective package states at a prior time on the apparatus, to select a series of transactions from the transaction records associated with the one or more individually specified software packages and their dependencies to determine the respective package states at the prior time, the series conducted between a current time and the prior time, and to roll back the dependencies and the one or more individually specified software packages to the respective package states at the prior time on the apparatus as determined by the series of transactions.

2. The apparatus of claim 1, comprising:
   a display with a graphical user interface to receive the request.

3. The apparatus of claim 1, comprising:
   a software package management module to receive the request.

4. A system, comprising:
   a server memory to store transaction records associated with a plurality of software packages; and
   a client processor to transmit a request to roll back one or more individually specified software packages included in the plurality of software packages to their respective package states at a prior time on the client processor, to select a series of transactions from the transaction records associated with the one or more individually specified software packages and their dependencies to determine the respective package states at the prior time, the series conducted between a current time and the prior time, and to roll back the dependencies and the one or more individually specified software packages to the respective package states at the prior time on the client processor as determined by the series of transactions.

5. The system of claim 4, comprising:
   a user interface device to receive the request.

6. The system of claim 4, wherein the server memory and the client processor can be coupled to communicate over a wireless network.

7. A method, comprising:
   receiving a request to roll back one or more individually specified software packages to their respective package states at a prior time on a processing system;
   selecting, using one or more processors, a series of transactions from transaction records associated with the one or more individually specified software packages and their dependencies to determine the respective package states at the prior time, the series conducted between a current time and the prior time; and rolling back the dependencies and the one or more individually specified software packages to the respective package states at the prior time on the processing system as determined by the series of transactions.

8. The method of claim 7, comprising:
receiving the request from a command-line interface provided by the processing system.

9. The method of claim 8, comprising:
receiving the request formatted to include the prior time and a name of the one or more software packages.

10. The method of claim 7, comprising:
receiving the request formatted as a package management utility command.

11. The method of claim 7, comprising:
receiving the request as one of a user-specified request or a machine-specified request.

12. The method of claim 7, wherein determining the series of transactions comprises:
querying a transaction database on the processing system.

13. The method of claim 7, comprising:
parsing the series of transactions to determine the respective package states at the prior time.

14. The method of claim 7, comprising:
parsing the series of transactions to determine respective dependency states of the dependencies at the prior time.

15. The method of claim 14, wherein rolling back the dependencies comprises:
rolling back the dependencies to the respective dependency states at the prior time.

16. The method of claim 7, comprising:
receiving the prior time as a specific date-time convertible to an integer.

17. A method, comprising:
recording transaction information associated with a plurality of software packages on a processing system;
receiving a request to roll back one or more individually specified software packages included in the plurality of software packages to their respective package states at a prior time on the processing system;
filtering, using one or more processors, from the transaction information a series of transactions conducted between a current time and the prior time to form a subset of the transaction information associated with the one or more individually specified software packages and their dependencies, the forming to determine the respective package states at the prior time; and
rolling back the dependencies and the one or more individually specified software packages to the respective package states at the prior time on the processing system as determined by the subset of the transaction information.

18. The method of claim 17, wherein recording the transaction information comprises:
recording the transaction information in a database.

19. The method of claim 18, wherein filtering the series of transactions comprises:
querying the database to define the subset, based on information included in the request.

20. The method of claim 18, wherein the database comprises:
at least one each of a date-time, an operation associated with the date-time, a name of one of the one or more individually specified software packages associated with the date-time, and version information associated with the date-time.

21. The method of claim 17, comprising:
accessing the subset to determine the respective package states at the prior time.

22. The method of claim 21, comprising:
accessing the subset to determine respective dependency states of the dependencies at the prior time.

23. The method of claim 17, wherein rolling back comprises:
rolling back the dependencies and the one or more individually specified software packages to the respective package states defined by the subset to exist at the prior time.

* * * * *